UNITED STATES PATENT OFFICE.

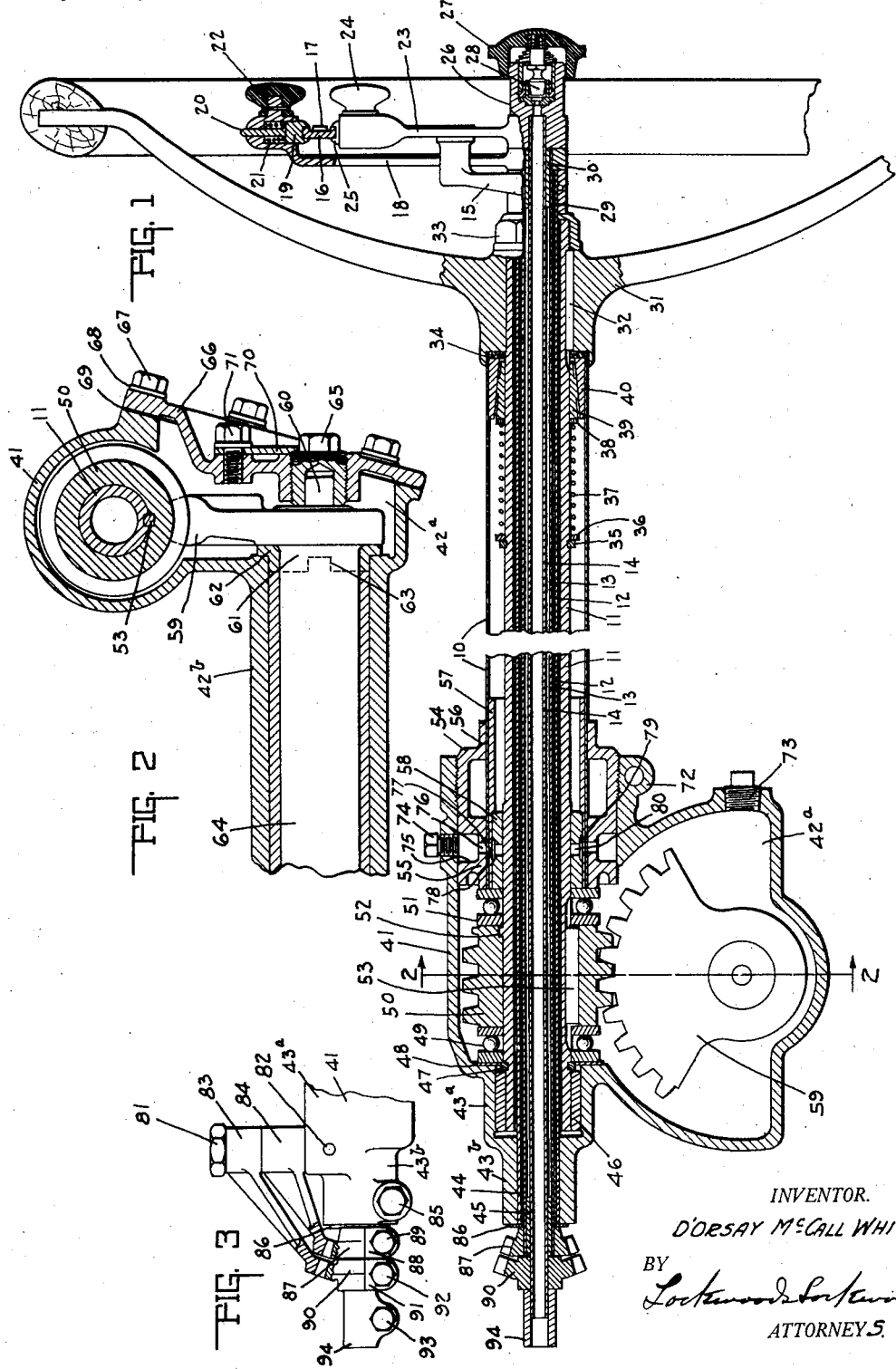
D'ORSAY McCALL WHITE.
STEERING MECHANISM FOR MOTOR VEHICLES.
APPLICATION FILED FEB. 24, 1920.
1,391,031. Patented Sept. 20, 1921.
INVENTOR.
D'ORSAY McCALL WHITE
BY
ATTORNEYS.

D'ORSAY McCALL WHITE, OF INDIANAPOLIS, INDIANA, ASSIGNOR TO LA FAYETTE MOTORS COMPANY, OF INDIANAPOLIS, INDIANA, A CORPORATION.

STEERING MECHANISM FOR MOTOR-VEHICLES.

1,391,031.         Specification of Letters Patent.    Patented Sept. 20, 1921.

Application filed February 24, 1920. Serial No. 360,895.

*To all whom it may concern:*

Be it known that I, D'ORSAY McCALL WHITE, a subject of Great Britain, and a resident of Indianapolis, county of Marion, and State of Indiana, have invented a certain new and useful Steering Mechanism for Motor-Vehicles; and I do hereby declare that the following is a full, clear, and exact description thereof, reference being had to the accompanying drawings, in which like numerals refer to like parts.

The chief object of this invention is to provide in a motor vehicle a steering mechanism of the Gemmer type, and construct the same so that the steering mechanism may be readily removed from the chassis of the motor vehicle without disturbing the engine thereof.

The chief feature of this invention consists in the arrangement of several associated parts at the base of the steering column, which permits the removal of the steering gear from the chassis and engine thereof.

Another feature of the invention consists in providing a housing at the base of the steering column wherein lubricant may be supplied to the bearing parts carried by the housing, and in constructing said parts so that lubricant will be conducted by the same to other parts.

The full nature of this invention will be understood from the accompanying drawings and the following description and claims.

In the drawings Figure 1 is a longitudinal central sectional view of the steering column and associated mechanism. Fig. 2 is a sectional view taken on the line 2—2 of Fig. 1. Fig. 3 is a plan view on the steering column connections at the base thereof taken at right angles to Fig. 1, several of the parts being broken away to show other features.

Before proceeding to describe the particular features of the invention a general detailed description of the steering gear to which the same is applied will be given. The steering gear herein shown is, as stated, of the Gemmer type, and the chief replacement thereof is the segmental worm gear replacing the full worm gear in the usual Gemmer construction. With this replacement the arrangement of parts is very compact and at the same time permits the rearrangement of other parts of this particular type of steering mechanism so that the same may be readily detached from the chassis without disturbing the engine.

In the drawings 10 indicates the usual steering column tube inclosing the usual hollow steering mast or post 11, within which are the concentric supporting tubes 12, 13 and 14. The tube 12 is stationarily secured to the chassis at the base of the steering column and carries upon its upper end a stationary bracket arm 15, said arm supporting the usual segment or quadrant 16, the same carrying a scale 17 upon the face thereof. The tube 13 is rotatably mounted within the tube 12 and carries upon its upper end the fuel or gasolene lever arm 18, said lever arm upon its outer end being provided with an inwardly extending plunger 19, said plunger being provided with a stem 20 for seating the same and a coil spring 21 for forcing said plunger 19 to normally engage the segment 16, as shown. Upon the outer end of said lever arm 18 there is secured the usual finger engaging knob 22 by which said lever arm is rotated upon and relative to the segment 16 in the usual manner, whereby when rotated or rocked the motion thereof will be transmitted from the lever arm 18 through the tube 13 to the mechanism secured upon the opposite end thereof, said mechanism being connected with the fuel supply of the motor vehicle. Similarly the tube 14 is positioned within the tube 13 and extends beyond the same and carries upon its outer end a lever arm 23, said lever arm being provided with a similar knob 24 and a similar plunger 25, the same being similar in operation and action to the before-mentioned lever arm and finger engaging knob thereof. The mechanism connected to the lower end of the tube 14 is connected with the ignition system of the motor vehicle.

On the hub portion 26 of the lever 23 there is positioned the usual push button 27 for actuating the horn or other warning means carried by the motor vehicle. A switch 28 controls the circuit thereof which is formed through parts being grounded to the chassis and an insulated conductor not shown, which extends up through the hollow tube 14 and communicates at the upper end thereof with the switch 28 operated by the horn button. It will be understood that the arms 15, 18 and 23 are rigidly secured to the tubes 12, 13 and 14, and herein the same are spaced from each other by means of the bushings 29 and 30 at the outer ends thereof.

Positioned adjacent the fuel and ignition controlling levers is the usual steering wheel 31, the same being suitably secured to the upper end of the steering mast 11 by means of a key 32 and a securing cap nut 33. The wheel 32 is provided with an annular seat 34 in the hub portion thereof, said seat being adapted to receive the column tube 10, as shown. Within the tube 10 and near the head of said steering mast there is secured upon the exterior thereof a locking ring 35 and adjacent thereto is a washer 36. Concentric with said shaft and extending forwardly thereof, and having one end abutting said washer, is a coiled spring 37, the other end thereof abutting a similar washer 38, said last mentioned washer abutting a conical shaped sleeve 39, the same being adapted to be received by a similarly formed sleeve 40, said sleeve 40 being seatable in the annular seat 34. The members 35 to 40 inclusive constitute what is commonly termed and anti-rattling device, since the sleeve 39 is projected forwardly into locking engagement with the sleeve 40 by the spring 37 to secure the steering mast and wheel and column in a substantially rigid connection. All of the foregoing construction is old in the art and may be assembled in the described relation without the necessity of building up said parts upon the chassis.

The means for detachably securing the several coöperating parts together will now be described. Positioned upon the chassis and secured thereto adjacent the base of the steering column is the housing 41, said housing having a depending portion 42$^a$ integral therewith and forming a segmental gear chamber. Extending transversely of said depending portion 42$^a$ is a tubular housing portion 42$^b$, see Fig. 2. The housing portion 41 constitutes the receiving member for the base of the steering column and also constitutes the housing for the worm mechanism. The housing 41 is provided with a restricted portion 43$^a$ adapted to receive and seat the steering mast 11, and concentric therewith and extending outwardly from the restricted portion 43$^a$ is a further restricted portion 43$^b$, in which the tube 12 is stationarily secured, and through which the rotatable tubes 13 and 14 extend, said tubes being spaced from each other by means of the sleeves or bushings 44 and 45 respectively. The other end of the portion 41 is open and provided with means for closing the same. It will be understood that when the means associated with the ends of the shafts 13 and 14 respectively are removed, the entire tube can be removed through the open end of the housing 41, when the open end closing means are removed therefrom.

Within the housing 41 there is secured adjacent the lower end of the steering mast 11, a bushing 46, and positioned forwardly thereof upon the mast and in the order mentioned is a locking ring 47, a bearing washer 48, a ball thrust race 49, a worm 50 and inner ball race 51, as shown. The downward movement of the steering mast, through the worm and ball race, is limited by a lock projection or lug 52. The worm 50 is non-rotatably secured to the mast 11 by any suitable means such as the key 53. The open end of the housing 41 is threaded and adapted to receive a threaded nut 54, said nut at each end thereof being provided with suitable bearing portions 55 and 56. The bearing 55 is adapted to abut the race 51 and be limited in downward movement. Within the bearing 55 there is secured the steering column tube 10, and within the same is positioned a sleeve member 57, while within said sleeve is positioned a spacing sleeve 58, said last mentioned sleeve rotatably supporting said steering mast, as shown. The bearing 56 engages the tube 10 forwardly of the bearing 55 and the sleeve 57 is projected upwardly within said tube adjacent said bearing 56, so that said tube is centered or positioned concentric to the steering mast and is rigidly supported concentric therewith. Within the housing portion 42$^a$ there is positioned a segmental worm gear 59, the same meshing with the worm 50, whereby motion from the steering mast will be transmitted to the gear to rock the same. The segmental gear 59 is provided upon one face with a bearing 60, and upon the other face with a driving bearing 61, said driving bearing being rotatably supported within the housing portion 42$^a$ by a bearing ring 62 supported within the tubular casing portion 42$^b$. The driving bearing 61 is shown slotted at 63 to form a detachable driving connection with the shaft 64, the adjacent end thereof being complementarily slotted. A bearing plug 65 rotatably seats the bearing 60 of said segmental gear. From the foregoing it will be understood that rocking movement of said segmental gear will be transmitted through the driving connection to the shaft 64 and thence to the steering mechanism connected with the wheels. The gear portion 42 of the housing is herein shown provided with an open face, the same being closed by a detachable cover portion 66, the same being secured to said housing by means of suitable bolts 67 and lock washers 68 and forming a leak proof joint by means of a gasket 69 positioned between said housing and said cover. As shown clearly in Fig. 2 the bearing 65 has a threaded connection with the cover plate 66 and may be adjustably secured therein and locked in the adjusted position by means of the depending locking member 70 and the bolt 71.

As shown clearly in Fig. 2 when the cover plate 66 is removed from the segmental gear portion 42ª of the housing 42, by removing the bolts 67 therefrom, the segmental gear 59 may be withdrawn through the opening covered by said cover plate, since the segmental gear has a detachable driving connection 63, as shown, with the shaft 64. When the gear is thus withdrawn from meshing with the worm 50, the latter with the steering column and included mechanism may be withdrawn through the opening closed by the nut 54. As shown in Fig. 1, the nut 54 is held in the adjusted position by means of the slotted clamping portion 72, said portions being secured by the usual means, such as a bolt or the like, not shown.

From the foregoing it will be understood that the worm and segmental worm gear are inclosed in a housing, which may be filled with a lubricant, the segmental gear housing 42ª being supplied through a grease plug 73 secured therein and positioned adjacent the clamping portion 72. In the worm housing 41, positioned upon the opposite side of the clamping portion 72, there is a grease plug 74, said grease plug communicating with the nut 54 and the sleeves 57 and 58 to lubricate the tube 10 and the steering mast or shaft 11. Means for conveying the fluid from the interior of the housing to said parts for supplying lubricant thereto, consists of an annular channel 75 formed in the outer face of the threaded nut 54 in the bearing portion 55 thereof. Extending through said nut and radially thereof, are a plurality of discharge openings 76, said openings communicating with the annular channel 75 and discharging upon the steering column tube 10. Adjacent said openings and adapted to register therewith are a plurality of steering column tube openings 77, and registering therewith are a plurality of sleeve openings 78, as shown most clearly in Fig. 1. Lubricant supplied to the channel 75 is conveyed through the registering openings 76, 77 and 78 to the sleeve 58. Upon the exterior of said sleeve there is formed an annular channel 79, into which said registering openings discharge. Communicating with said annular channel 79 are a plurality of radial discharge outlets 80, said outlets supplying lubricant to the bearing surface between said sleeve 58 and the steering mast 10.

From the foregoing it will be understood that the stationary and rotating parts are lubricated by means of the registering openings and the concentric annular channels formed in the several parts. It will also be understood that the annular channels 75 communicate with the gear housing portion 42ª whereby lubricant may work up through the before mentioned channel means to lubricate said parts.

Positioned upon the lower end of the steering column are means for transmitting the various movements of the several tubes to individual actuating mechanisms, shown most clearly in Figs. 1 and 3. Projecting outwardly from the housing 41 adjacent the restricted portion 43ª is a stud member 81, said stud being non-rotatably secured by means of a pin 82. Upon said stud are rotatably supported the segmental beveled gears 83 and 84, said beveled gear segments projecting downwardly and terminating adjacent the open end of the restricted portion 43ᵇ of said casing. The restricted end 43ᵇ is slotted, and bolt means 85 securely clamps the spacing sleeves or bushings 44 and 45, as well as stationarily securing the stationary tube 12. Positioned upon the projecting tubes 13 and 14, and carried thereby adjacent the lower end of said restricted housing portion 43 and the stationary tube 12, is a bearing washer 86. Adjacent said bearing washer and non-rotatably secured upon the tube 13 is a segmental beveled pinion 87, said pinion meshing with the segmental beveled gear 84. Said tube 13 terminates at the end of said beveled pinion, the latter being detachably secured thereto by means of the split collar portion 88 and the bolt and washer means 89. Positioned adjacent the beveled pinion 87 is the beveled pinion 90, said beveled pinion having a similarly split portion 91 to detachably and non-rotatably secure the pinion to the tube 14 by means of the usual bolt and washer 92. The segmental beveled pinion 90 meshes with the segmental beveled gear 83 for transmitting rotational movement of said tube 14 to said segmental gear 83. The tube 14 extends forwardly through said beveled pinion 90, and positioned upon the end thereof and detachably secured thereto by means of the bolt 93, is a nipple 94. The nipple 94 is adapted to have a soldered connection with the flexible horn circuit tube, whereby the same is secured to the steering column, and whereby the circuit wire therein may be conducted through said tube 14 to the switch member 28 for actuating the horn of the motor vehicle when the button 27 is depressed in the usual manner.

With the foregoing construction it will be understood that the housing portions 41, 42ª, 42ᵇ, 43ª and 43ᵇ are integral and are stationarily secured to the chassis frame by any suitable means. The housing as described is inclosed by means of the cover plate 66 and the nut and cap and bearing 54, said housing being provided with suitable means for supplying lubricant thereto. Within said housing the parts are so positioned and so formed that lubricant is supplied to all bearing parts.

As shown in the drawings when the cover 66 is removed from the gear housing portion 42ª the gear 59 may be removed from engagement with the worm by moving the same through the opening covered by the plate 66. The nut 54 when released from clamping engagement with the housing 41, and from threaded engagement therewith, is drawn upwardly along the steering column tube 10. The bolts 85, 89, 92 and 93 are then turned to release the respective parts from engagement with the tubes 12, 13 and 14 respectively. The nipple 94, segmental beveled pinions 90 and 87, and washer 86 may thus be removed from engagement with said tubes and with the segmental beveled gears 83 and 84, as shown. The steering column tube, with all the associated tubes and steering mast, including the two ball races, worm, and sleeves 57 and 58 may then be withdrawn through said housing and through the threaded opening closed by the nut 54. The steering column, it will be noted, can be assembled independently of the connecting mechanism and the gasolene and ignition actuating gears 84 and 83 respectively, as well as the steering mechanism associated with the shaft 64.

While the invention has been described in great detail in the foregoing specification, the broader features thereof, of detachably connecting the several parts so that the steering column tube may be detachable therefrom for repairs and the like, or for assembly purposes, are not to be limited.

The invention claimed is:

1. In a steering mechanism for motor vehicles and the like the combination with a steering mast, and a housing rotatably supporting said mast, of a nut having a threaded engagement with said housing and concentric with said mast, said nut having an annular channel therein, said channel being provided with a plurality of radially extending slots extending therethrough, and a sleeve positioned within said nut and provided with radially extending openings registering with said first mentioned radial openings, said sleeve surrounding said mast and having an annular channel upon the mast engaging surface of said sleeve, said annular channel communicating with said radially extending openings, whereby lubricant may be conveyed from the annular channel in said nut to said steering mast.

2. In a steering mechanism for motor vehicles and the like the combination with a steering mast, a steering column tube concentric therewith and surrounding said mast, and a housing positioned adjacent the base of said mast and tube and surrounding the end thereof, of a nut secured in said housing and concentric with said mast and tube and surrounding the same, a pair of annular bearings engaging said tube to center the same, a sleeve positioned between said tube and said nut bearing, and a second sleeve positioned between said tube and said mast within said bearings, said tube and said sleeves being provided with registering openings and said nut bearing and the inner of said sleeves being provided with concentric annular channels, said channels communicating with said registering openings, and said sleeve channel discharging adjacent said mast to lubricate the same.

In witness whereof I have hereunto affixed my signature.

D'ORSAY McCALL WHITE.